United States Patent
Guy et al.

(10) Patent No.: US 8,407,502 B1
(45) Date of Patent: Mar. 26, 2013

(54) POWER SAVING TECHNIQUES FOR BATTERY-POWERED COMPUTING DEVICES

(75) Inventors: Romain P. Guy, Millbrae, CA (US); Mathias Marc Agopian, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/547,575

(22) Filed: Jul. 12, 2012

(51) Int. Cl.
*G06F 1/32* (2006.01)

(52) U.S. Cl. ............ 713/320; 713/324; 713/340

(58) Field of Classification Search ........... 713/300–324
See application file for complete search history.

(56) References Cited

U.S. PATENT DOCUMENTS

| | | | |
|---|---|---|---|
| 6,704,879 B1 * | 3/2004 | Parrish | 713/322 |
| 6,947,035 B1 * | 9/2005 | Shiraga | 345/211 |
| 2006/0005058 A1 | 1/2006 | Chen et al. | |
| 2010/0020092 A1 | 1/2010 | Canu et al. | |
| 2010/0277454 A1 * | 11/2010 | Gettemy et al. | 345/211 |
| 2010/0317408 A1 * | 12/2010 | Ferren et al. | 455/566 |
| 2011/0040996 A1 * | 2/2011 | Hackborn et al. | 713/340 |

* cited by examiner

*Primary Examiner* — Dennis M Butler
(74) *Attorney, Agent, or Firm* — Remarck Law Group PLC (57) ABSTRACT

A computer-implemented technique is presented. The technique can include determining, at a computing device including one or more processors, a power remaining in a battery of the computing device. The technique can include determining, at the computing device, a selected operating mode from a plurality of operating modes for the computing device based on the power remaining in the battery. Each of the plurality of operating modes can correspond to a different range of power remaining in the battery of the computing device. The technique can also include adjusting, at the computing device, operation of the computing device based on the selected operating mode. The selected operating mode can be associated with one or more display functions of the computing device, and adjusting operation of the computing device can include adjusting operation of the one or more display functions to adjust power usage of the computing device.

19 Claims, 5 Drawing Sheets

POWER SAVING TECHNIQUES FOR BATTERY-POWERED COMPUTING DEVICES

FIELD

The present disclosure relates to battery-powered computing devices and, more particularly, to power saving techniques for battery-powered computing devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A computing device capable of being powered by a battery can be referred to as a "battery-powered computing device." For example, battery-powered computing devices can include mobile computing devices, such as laptop computers, tablet computers, and mobile phones. A battery of a battery-powered computing device has a limited amount of power. Some functions of the battery-powered computing device can consume more power than other functions. For example, some display-related functions can consume a large amount of power. When the power remaining in the battery decreases to less than or equal to a predetermined threshold, e.g., approximately 0% charge, the battery-powered computing device may power off. In some cases, the battery-powered computing device cannot be powered on again until the battery has been at least partially recharged.

SUMMARY

A computer-implemented technique is presented. The technique can include determining, at a battery-powered computing device including one or more processors and an organic light emitting diode (OLED) display, a power remaining in a battery of the battery-powered computing device. The technique can include determining, at the battery-powered computing device, a selected operating mode from a plurality of operating modes for the battery-powered computing device based on the power remaining in the battery. The plurality of operating modes can include first, second, and third operating modes corresponding to first, second, and third ranges of power remaining in the battery, respectively. The first range can be greater than the second range and the second range can be greater than the third range. The technique can also include adjusting, at the battery-powered computing device, operation of the battery-powered computing device based on the selected operating mode. For the first operating mode, adjusting operation of the battery-powered computing device can include disabling blur and animation functions of the OLED display. Adjusting operation of the battery. For the second operating mode, adjusting operation of the battery-powered computing device can include (i) disabling blur and animation functions of the OLED display and (ii) decreasing a resolution of images displayable on the OLED display. For the third operating mode, adjusting operation of the battery-powered computing device can include (i) disabling blur and animation functions of the OLED display, (ii) decreasing the resolution of images displayable on the OLED display, and (iii) commanding the OLED display to display only black and red colors.

Another computer-implemented technique is also presented. The technique can include determining, at a computing device including one or more processors, a power remaining in a battery of the computing device. The technique can include determining, at the computing device, a selected operating mode from a plurality of operating modes for the computing device based on the power remaining in the battery. Each of the plurality of operating modes can correspond to a different range of power remaining in the battery of the computing device. The technique can also include adjusting, at the computing device, operation of the computing device based on the selected operating mode. The selected operating mode can be associated with one or more display functions of the computing device, and adjusting operation of the computing device can include adjusting operation of the one or more display functions to adjust power usage of the computing device.

In some embodiments, the plurality of operating modes can include first, second, and third operating modes corresponding to first, second, and third ranges of power remaining in the battery, respectively. The first range can be greater than the second range and the second range can be greater than the third range.

In other embodiments, the one or more display functions associated with the first operating mode can include at least one of blur and animation functions of a display of the computing device.

In some embodiments, adjusting operation of the computing device for the first operating mode can include disabling at least one of blur and animation functions of the display.

In other embodiments, one or more display functions associated with the second operating mode can include a resolution of images displayable on the display of the computing device.

In some embodiments, adjusting operating of the computing device for the second operating mode can include (i) disabling at least one of blur and animation functions of the display and (ii) decreasing the resolution of images displayable on the display.

In other embodiments, one or more display functions associated with the third operating mode can include commanding a subset of colors displayable by a display of the computing device.

In some embodiments, the display of the computing device can be an organic light emitting diode (OLED) display.

In other embodiments, adjusting operation of the computing device for the third operating mode can include (i) disabling at least one of blur and animation functions of the OLED display, (ii) decreasing the resolution of images displayable on the OLED display, and (iii) commanding the OLED display to display only red and black colors.

In some embodiments, adjusting operation of the one or more display functions to decrease power usage of the computing device can include maintaining the power remaining in the battery of the computing device above a predetermined threshold. The predetermined threshold can be a minimum power required to execute an emergency function.

A computing device is also presented. The computing device can include one or more processors. The one or more processors can be configured to determine a power remaining in a battery of the computing device. The one or more processors can also be configured to determine a selected operating mode from a plurality of operating modes for the computing device based on the power remaining in the battery. Each of the plurality of operating modes can correspond to a different range of power remaining in the battery of the computing device. The one or more processors can also be configured to adjust operation of the computing device based on the selected operating mode. The selected operating mode can be associated with one or more display functions of the computing device, and adjusting operation of the computing device includes adjusting operation of the one or more display functions to adjust power usage of the computing device.

In some embodiments, the plurality of operating modes can include first, second, and third operating modes corresponding to first, second, and third ranges of power remaining in the battery, respectively. The first range can be greater than the second range and the second range can be greater than the third range.

In other embodiments, one or more display functions associated with the first operating mode can include at least one of blur and animation functions of a display of the computing device. Adjusting operation of the computing device for the first operating mode can include disabling at least one of blur and animation functions of the display.

In some embodiments, one or more display functions associated with the second operating mode can include a resolution of images displayable on the display of the computing device.

In other embodiments, the one or more processors can be configured to adjust operation of the computing device in the second operating mode by (i) disabling at least one of blur and animation functions of the display and (ii) decreasing the resolution of images displayable on the display.

In some embodiments, one or more display functions associated with the third operating mode can include commanding a subset of colors displayable by a display of the computing device.

In other embodiments, the display of the computing device is an organic light emitting diode (OLED) display.

In some embodiments, the one or more processors can be configured to adjust operation of the computing device in the third operating mode by (i) disabling at least one of blur and animation functions of the OLED display, (ii) decreasing the resolution of images displayable on the OLED display, and (iii) commanding the OLED display to display only red and black colors.

In other embodiments, the one or more processors can be configured to adjust operation of the one or more functions to decrease power usage of the computing device by maintaining the power remaining in the battery of the computing device above a predetermined threshold. The predetermined threshold can be a minimum power required to execute an emergency function.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
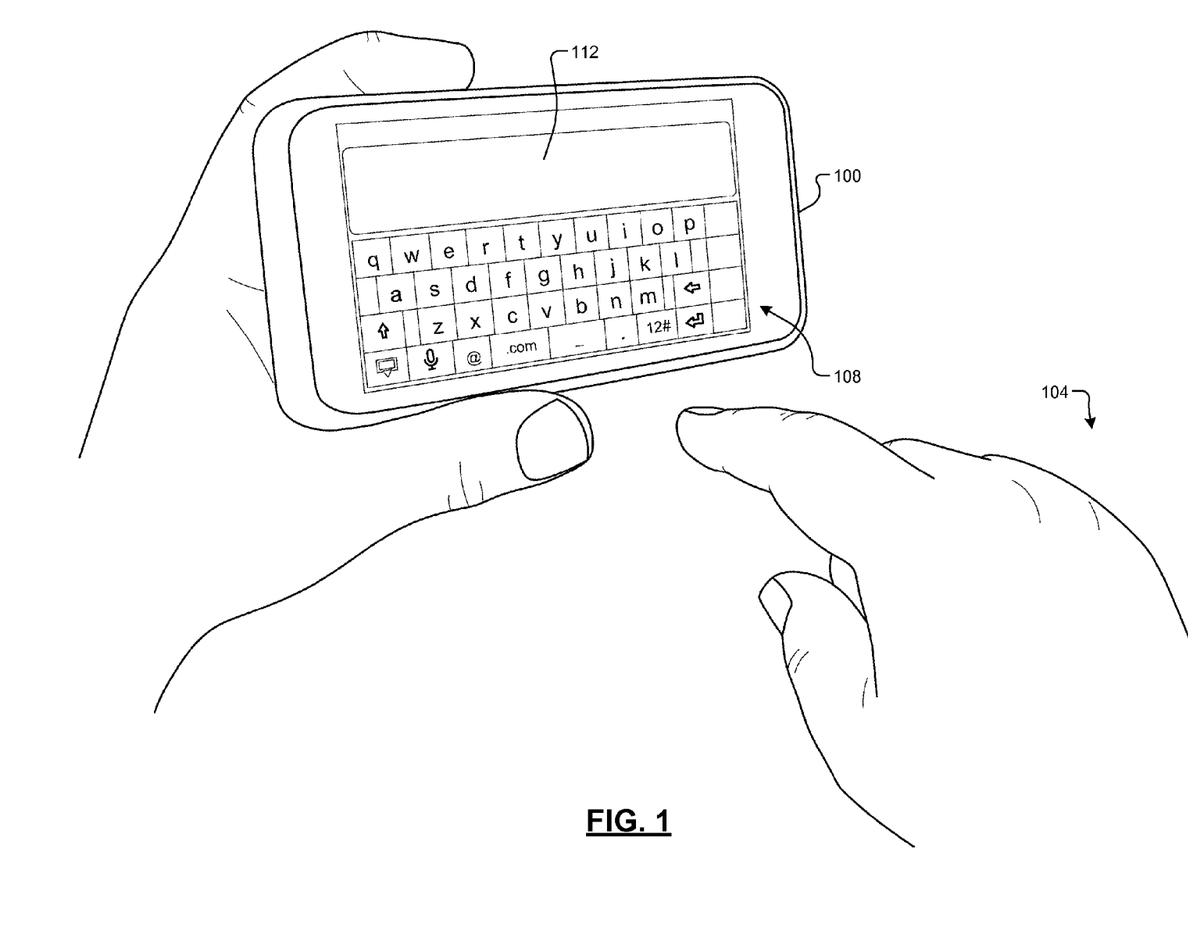
FIG. 1 is a schematic illustration of user interaction with a battery-powered computing device according to some implementations of the present disclosure.

Referring now to FIG. 1, interaction between a user 104 and a battery-powered computing device 100 is illustrated. The battery-powered computing device 100 can be powered by a battery (not shown). It should be appreciated that the battery-powered computing device 100 can be further configured to operate via standard, household power. Specifically, the battery-powered computing device 100 can be configured to recharge the battery via standard, household power. For purposes of simplicity, the battery-powered computing device 100 will now be referred to as "computing device 100." As previously mentioned, the computing device 100 can be a mobile computing device, such as a laptop computer, a tablet computer, or a mobile phone. The user 104 can provide input to and receive information from the computing device 100 via a user interface 108. The user interface 108 can include a display 112. As shown, the display 112 may be a touch display. The user interface 108 can further include an input device (not shown), such as a physical keyboard.

The display 112 may consume a large amount of power. Other components, e.g., a transceiver for wireless communication, can also consume a large amount of power. Further, as previously mentioned, some functions of the computing device 100 can consume more power than other functions. In particular, display functions can consume large amounts of power. Specifically, for example, blur and animation functions for the display 112 can consume a large amount of power. When the power in the battery decreases to less than or equal to the predetermined threshold, e.g., approximately 0% charge, the computing device 100 can power off. Some functions, however, are more important than other functions and therefore draining the battery until the computing device 100 powers off may be undesirable. These important functions can also be referred to as "emergency functions." For example only, for a mobile phone implementation of the computing device 100, an example emergency function could include calling an emergency phone number, e.g., 911 in the United States.

Accordingly, power saving techniques are presented for battery-powered computing devices. The power saving techniques generally provide for adjustment of power consumption by a battery-powered computing device (hereinafter "computing device"), which provides for increased access to important functions, e.g., emergency functions.

The techniques can include determining, at a computing device comprising one or more processors, a power remaining in a battery of the computing device. The computing device can also be referred to as a battery-powered computing device. The techniques can include determining, at the computing device, a selected operating mode from a plurality of operating modes of the computing device based on the power remaining in the battery. The plurality of operating modes can represent various power saving modes for the computing device. Specifically, the plurality of operating modes can include first, second, and third operating modes corresponding to first, second, and third ranges of power remaining in the battery, respectively. The first range can be greater than the second range, and the second range can be greater than the third range. The plurality of operating modes can also be described as being associated with first, second, and third tiers of power remaining in the battery, respectively.

The techniques can include adjusting, at the computing device, operation of the computing device based on the selected operating mode. Adjusting operation of the computing device can include adjusting one or more display functions associated with the selected operating mode to adjust power consumption by the computing device. A function can generally refer to an executable function or operation by the computing device that consumes power in the battery. The functions described herein represent display functions, which refer to functions associated with a display of the computing device. It should be appreciated, however, that in some embodiments the functions can include other functions, such as communication functions. Further, adjusting a function can refer to enabling or disabling the function, such as disabling a high resolution for images displayable at the display and enabling a low resolution for images displayable at the display.

For the first operating mode, adjusting operation of the computing device can include disabling blur and animation functions of the display of the computing device. Blur can refer to changing a focus a portion of the display. Animation can refer to displaying a moving (or non-static) portion of the display during a period. For the second operating mode, adjusting operation of the computing device can include (i) disabling blur and animation functions of the display and (ii) decreasing a resolution of images displayable on the display. Resolution can refer to a number of distinct pixels displayable on the display, typically according to an aspect ratio, e.g., 480×320 pixels, or a 4×3 aspect ratio. For the third operating mode, adjusting operation of the computing device can include (i) disabling blur and animation functions of the display, (ii) decreasing the resolution of images displayable on the display, and (iii) commanding a subset of colors to be displayable by the display.

In some implementations, the computing device can include an organic light emitting diode (OLED) display. Each cell of an OLED display can include an electroluminescent layer of organic compounds, which can emit light in response to an electric current. OLED displays, therefore, can operate without backlighting. In this manner, OLED displays have different power consumption characteristics compared to traditional backlit displays, such as liquid crystal displays (LCDs). Specifically, OLED displays can use less power to display certain colors compared to traditional backlit displays. These colors can include, for example only, black and red. The subset of colors commanded by the techniques for the third operating mode, therefore, can include only black and red colors.

Figure 2:
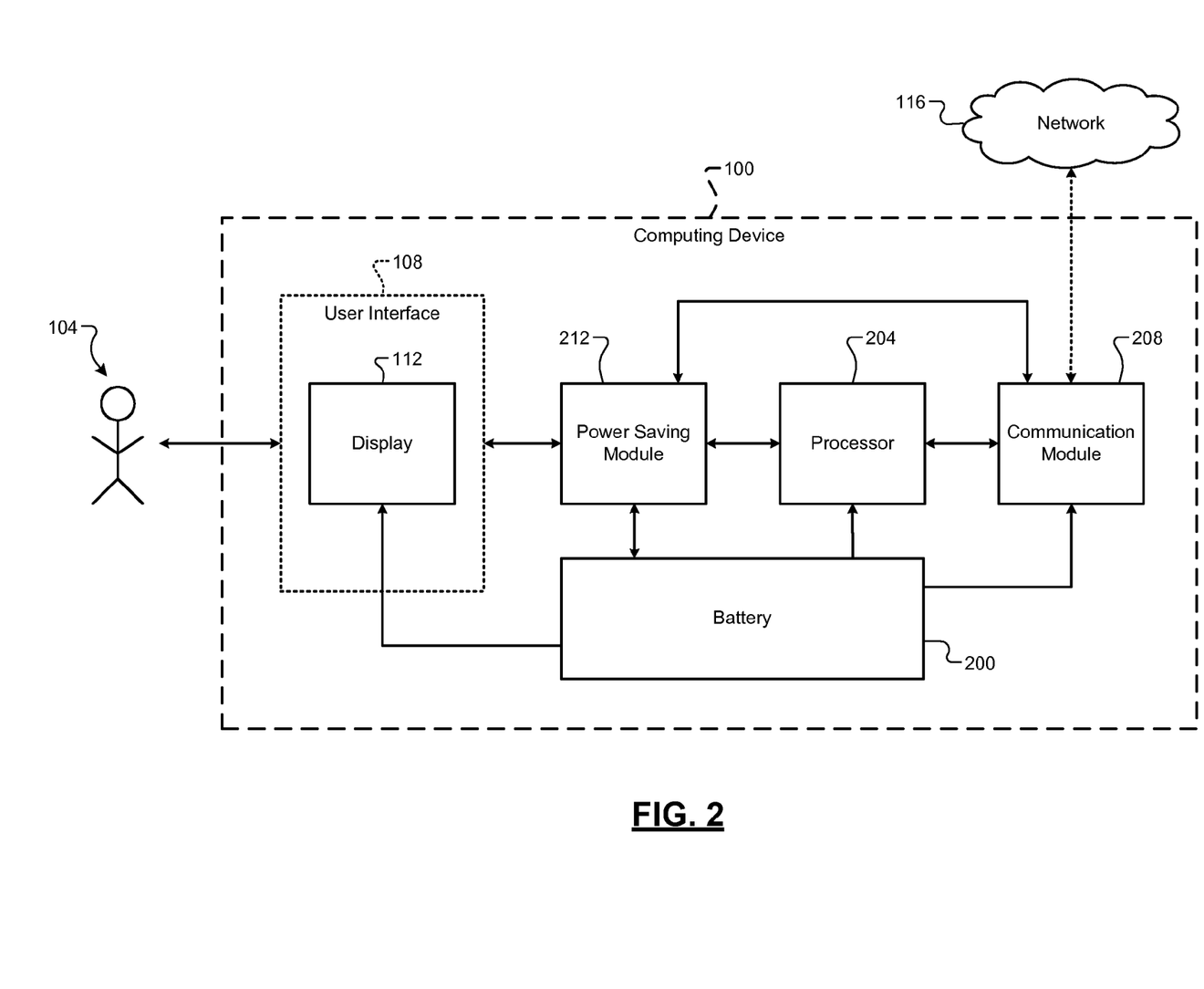
FIG. 2 is a functional block diagram of the battery-powered computing device of FIG. 1 including a power saving module according to some implementations of the present disclosure.

Referring now to FIG. 2, a schematic illustration of computing device 100 is shown. The computing device 100 can include the user interface 108, a battery 200, a processor 204, a communication module 208, and a power saving module 212. It should be appreciated that the computing device 100 can also include other components, such as memory. Further, the processor 204 can execute (wholly or partially) the various modules of the computing device 100.

The user interface 108 can include the display 112. As previously mentioned, the user interface 108 can also include one or more input devices (not shown), such as a physical keyboard. The user 104 can provide input to the computing device 100 via the user interface 108, e.g., via the display 112 (touch display) or the input device (not shown). Example user input can include spot or slide input (user selections, text, etc.) via the display 112 (touch display), button input via the input device, e.g., the physical keyboard, and/or speech, e.g., via a microphone. The computing device 100 can also display information to the user 104 on the display 112.

The battery 200 can provide a current, which can be used to power the computing device 100. More specifically, the battery 200 can provide current to each of the display 112, the processor 204, the communication module 208, and the power saving module 212. While a single battery 200 is shown, it should be appreciated that a battery system can be implemented, which can include a plurality of batteries connected either in a series configuration, a parallel configuration, or a combination thereof. For example only, the battery 200 can be a lithium ion (Li-ion) or a Li-ion polymer battery, although other types of batteries can also be implemented, such as lead-acid, nickel cadmium (NiCd), or nickel metal hydride (NiMH).

The processor 204 can control operation of the computing device 100. For example, the processor 204 can load and execute an operating system of the computing device 100. The processor 204 can also execute other functions such as controlling the display 112 and/or controlling the transmission and reception of information. Further, the processor 204 can execute (entirely or partially) the various modules of the computing device 100. The communication module 208 can control communication between the computing device 100 and other computing devices via a network 116. The network 116 can be a local area network (LAN), a wide area network WAN), e.g., the Internet, or a combination thereof. For example, the communication module 208 can include a transceiver (not shown) configured for wireless communication via the network 116.

The power saving module 212 can monitor a power remaining in the battery 200 of the computing device 100. The power saving module 212 can also select one of a plurality of operating modes for the computing device 100 based on the power remaining in the battery 200 to obtain a selected operating mode. As previously mentioned, the plurality of operating modes can represent various power saving modes for the computing device 100. For example, three different operating modes can be used, which can correspond to three ranges (or tiers) of power remaining in the battery 200, respectively. Based on the monitoring (the selected operating mode), the power saving module 212 can then control operation of the display 112 and/or the communication module 208 to decrease the power consumption of the computing device 100 (described in more detail below).

Figure 3:
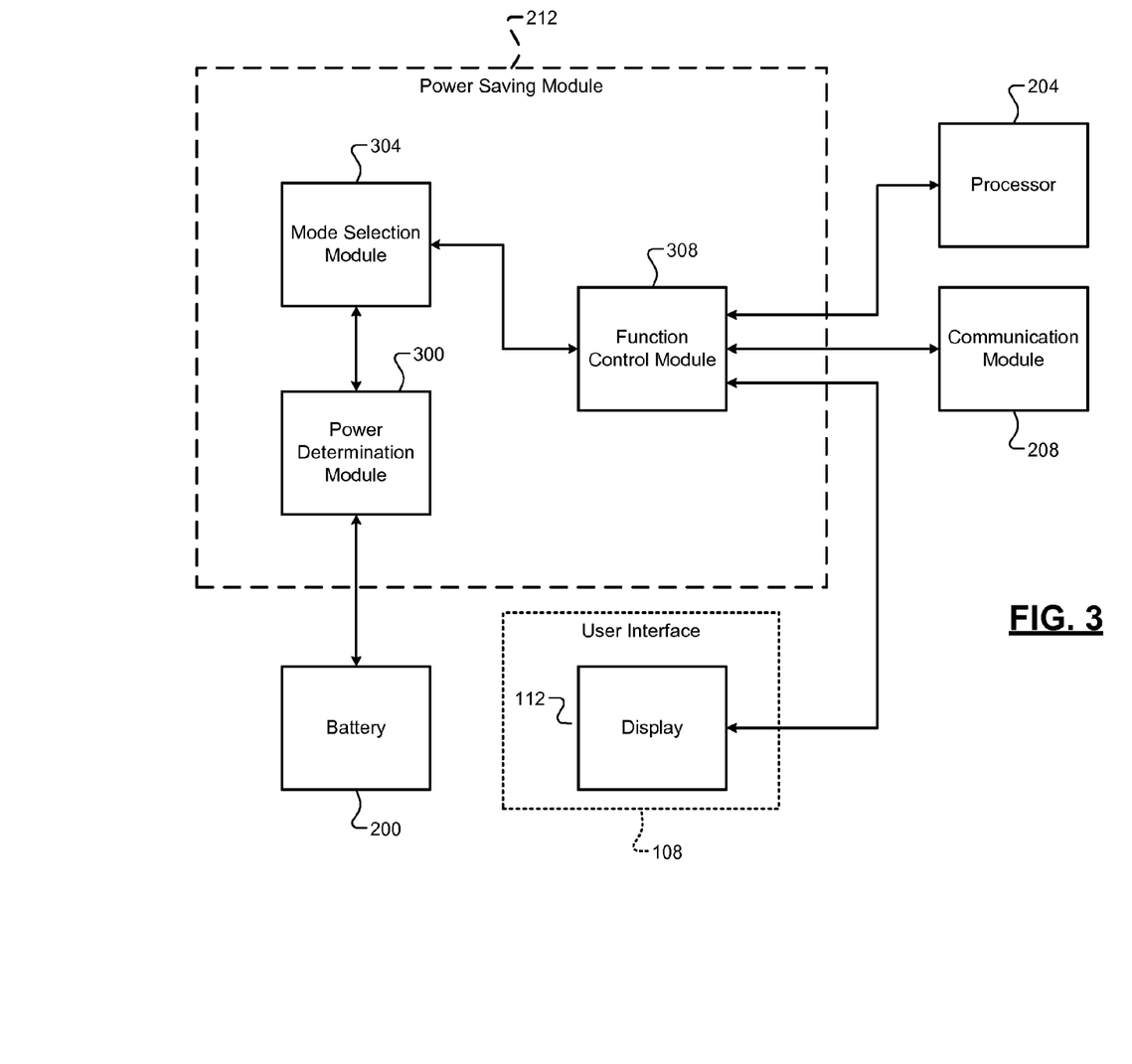
FIG. 3 is a functional block diagram of the power saving module of FIG. 2.

Referring now to FIG. 3, the power saving module 212 is illustrated. The power saving module 212 can include a power determination module 300, a mode selection module 304, and a function control module 308. It should be appreciated that the power saving module 212 can also include other components, such as memory. The processor 204 can execute (wholly or partially) the various modules of the power saving module 212.

The power determination module 300 can determine the power remaining in the battery 200. The power remaining in the battery 200 can be represented as a percentage of a maximum amount of charge capable of being stored by the battery 200 (90%, 50%, etc.). The power remaining in the battery 200 can also be determined based on one or more electrical measurements. For example, the power determination module 300 could measure a voltage across the battery 200 and then map the measured voltage to a percentage of charge and/or an estimated time until full discharge. It should be appreciated that other techniques can also be used to determine the power (or state of charge) remaining in the battery 200.

The mode selection module 304 can determine a selected operating mode for the computing device 100 based on the power remaining in the battery 200. The mode selection module 304 can determine a selected operating mode from a plurality of operating modes based on the power remaining in the battery 200. Each of the plurality of operating modes can be associated with one or more functions of the computing device 100 (described in detail below). The plurality of operating modes can include first, second, and third operating modes corresponding to first, second, and third ranges of power remaining in the battery 200. It should be appreciated that any number of operating modes can be implemented.

The mode selection module 304 can determine the selected operating mode from the plurality of operating modes having a corresponding range that includes the power remaining in the battery 200. For example, if the second operating mode has a corresponding range of 20-30% and the battery 200 has 25% power remaining, the mode selection module 304 can select the second operating mode. When the power remaining in the battery 200 is not within one of the ranges corresponding to the plurality of operating modes, the mode selection module 304 can select a normal or "default" operating mode. The normal operating mode can be associated with all functions of the computing device 100.

The first range of power remaining can be greater than the second range of power remaining, and the second range of power remaining can be greater than the third range of power remaining. For example only, the first range can be 20-30% power remaining, the second range can be 10-20% power remaining, and the third range can be 0-10% power remaining. Additionally, for example only, the normal mode could be associated with greater than 30% power remaining. It should be appreciated that the ranges for the various operating modes can vary depending on a design of the battery 200. For example, a larger capacity battery may have lesser and/or smaller ranges because of the relative amount of power remaining in comparison to a smaller capacity battery.

The function control module 308 can adjust one or more functions of the computing device 100 based on the selected operating mode. As previously mentioned, each of the plurality of operating modes can be associated with one or more functions of the computing device 100. The one or more functions each of the plurality of operating modes can be distinct or they can overlap. The one or more functions associated with the first operating mode can include blur and animation functions for the display 112. The one or more functions associated with the second operating mode can include a resolution of images displayable on the display 112. The one or more functions associated with the third operating mode can include colors displayable by the display 112.

The function control module 308 can then adjust the one or more functions associated with the selected operating mode. In the first operating mode, the function control module 308 can disable the blur and animation functions for the display 112. In the second operating mode, the function control module 308 can decrease the resolution of images displayable on the display 112. The function control module 308 can also disable the blur and animation functions for the display 112 in the second operating mode because the power remaining in the battery 200 is less than the first range corresponding to the first operating mode.

In the third operating mode, the function control module 308 can command a predetermined subset of colors to be displayable by the display 112. The function control module 308 can also disable the blur and animation functions of the display 112 and decrease the resolution of images displayable on the display 112 in the third operating mode because the power remaining in the battery 200 is less than the second range corresponding to the second operating mode and the first range corresponding to the first operating mode. The predetermined subset of colors represents a subset (or less than all) of a full spectrum of colors normally displayable by the display 112. The colors in the predetermined subset can correspond to colors that, when displayed, cause the display 112 to use less power compared to other colors. For example, for an OLED display the predetermined subset of colors can include only red and black.

It should be appreciated that each of the operating modes can be associated with other functions of the computing device 100. The functions for each of the first, second, and third operating modes, however, can generally be arranged based on their effect on the user 104. For example, disabling blur and animation for the display 112 may have less of an effect on the user 104 compared to decreasing the resolution of images displayable on the display 112. Similarly, for example, decreasing the resolution of images displayable on the display 112 may have less of an effect on the user 104 compared to commanding a predetermined subset of colors to be displayed by the display 112.

It should also be appreciated that the function control module 308 could also adjust other functions of the computing device 100. For example, the function control module 308 can disable communication with other computing devices (not shown). This can include the function control module 308 disabling the communication module 208. Some or all forms of communication can be disabled. For example, wireless communication could be disabled and wired communication could remain enabled. It should be appreciated that the function control module 308 can be configured to adjust any functions relating to power consumption of the computing device 100 in order to decrease power consumption by the computing device 100. Emergency functions, e.g., emergency calling, may always remain enabled. For example, adjusting operation of the one or more functions to decrease power usage of the computing device 100 can generally include maintaining the power remaining in the battery 200 above another predetermined threshold that represents a minimum power required to execute an emergency function.

Figure 4:
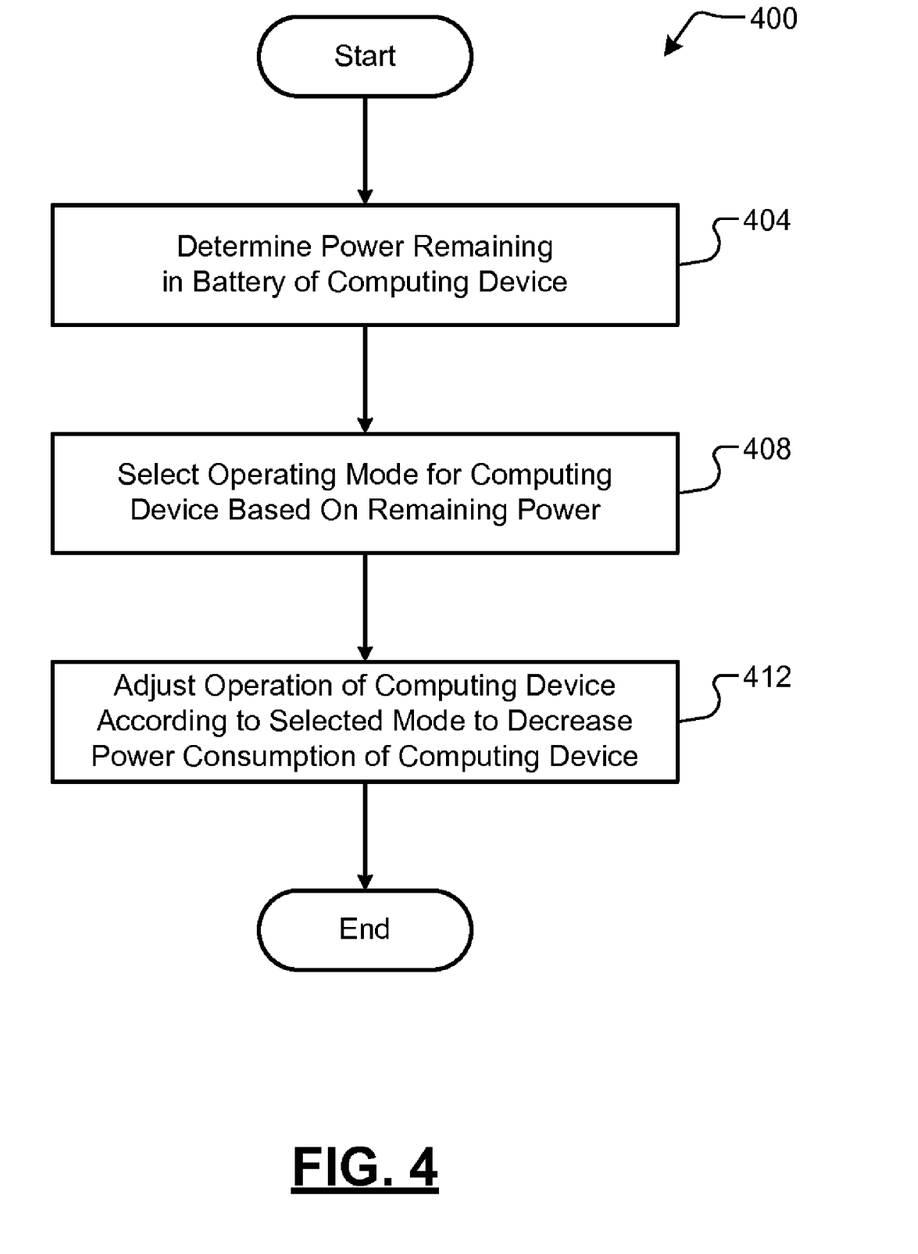
FIG. 4 is a flow diagram of an example power saving technique for a battery-powered computing device according to some implementations of the present disclosure.

Referring now to FIG. 4, an example power saving technique 400 is illustrated. At 404, the power determination module 300 can determine, at the computing device 100, a power remaining in the battery 200 of the computing device 100. At 408, the mode selection module 304 can determine, at the computing device 100, a selected operating mode from a plurality of operating modes of the computing device 100 based on the power remaining in the battery 200. Each of the plurality of operating modes can correspond to a different range of power remaining in the battery 200 of the computing device 100.

At 412, the function control module 308 can adjust, at the computing device 100, operation of the computing device 100 based on the selected operating mode. The selected operating mode can be associated with one or more functions of the computing device 100. Adjusting operation of the computing device 100 can include adjusting operation of the one or more functions to decrease power usage of the computing device 100. The technique 400 can then end or return to 404 for one or more additional cycles.

Figure 5:
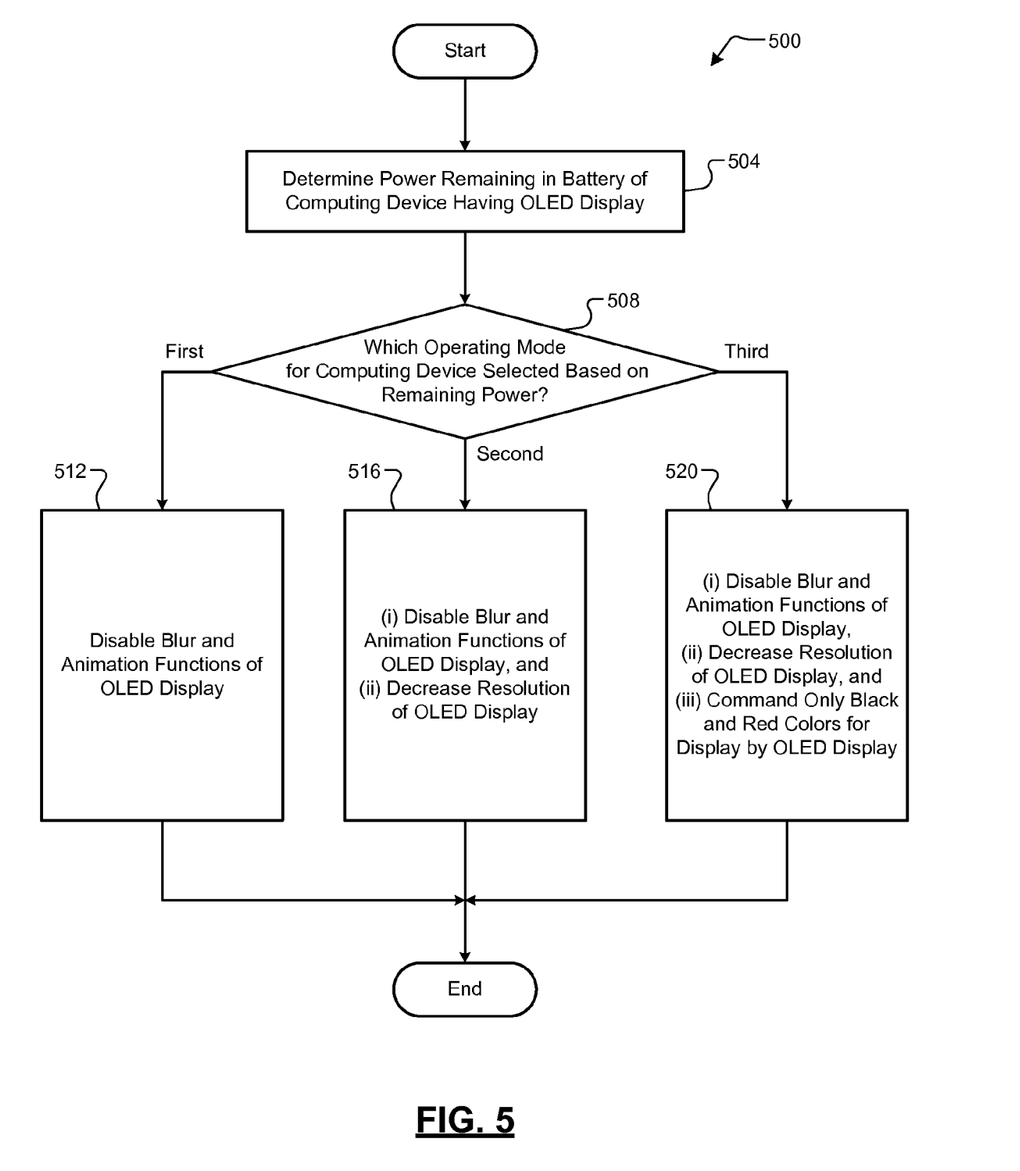
FIG. 5 is a flow diagram of another example power saving technique for a battery-powered computing device according to some implementations of the present disclosure.

Referring now to FIG. 5, another example power saving technique 500 is illustrated. It should be appreciated that the power saving technique 500 can be directed to battery-powered computing devices having OLED displays (referred to here as the computing device 100 and the display 112, respectively). At 504, the power determination module 300 can determine, at the computing device 100, a power remaining in the battery 200 of the computing device 100. At 508, the mode selection module 304 can select, at the computing device 100, one of the plurality of operating modes for the computing device 100 based on the power remaining in the battery 200 to obtain a selected operating mode. The plurality of operating modes can include first, second, and third operating modes for first, second, and third ranges of power remaining in the battery 200, respectively. The first range can be greater than the second range. The second range can be greater than the third range.

When the selected operating mode is the first operating mode, the technique 500 can proceed to 512. When the selected operating mode is the second operating mode, the technique 500 can proceed to 516. When the selected operating mode is the third operating mode, the technique 500 can proceed to 520. At 512, the function control module 308 can disable blur and animation functions of the display 112 of the computing device 100. The technique 500 can then end or return to 504 for one or more additional cycles. At 516, the function control module 308 can (i) disable the blur and animation functions of the display 112 and (ii) decrease a resolution of images displayable on the display 112. The technique 500 can then end or return to 504 for one or more additional cycles. At 520, the function control module 308 can (i) disable the blur and animation functions of the display 112, (ii) decrease the resolution of images displayable on the display 112, and (iii) command the display 112 to display only black and red colors. The technique 500 can then end or return to 504 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
determining, at a battery-powered computing device including one or more processors and an organic light emitting diode (OLED) display, a power remaining in a battery of the battery-powered computing device;
determining, at the battery-powered computing device, a selected operating mode from a plurality of operating modes for the battery-powered computing device based on the power remaining in the battery, the plurality of operating modes including first, second, and third operating modes corresponding to first, second, and third ranges of power remaining in the battery, respectively, the first range being greater than the second range and the second range being greater than the third range; and
adjusting, at the battery-powered computing device, operation of the battery-powered computing device based on the selected operating mode, wherein adjusting operation of the battery-powered computing device includes:
for the first operating mode, disabling blur and animation functions of the OLED display,
for the second operating mode, (i) disabling blur and animation functions of the OLED display and (ii) decreasing a resolution of images displayable on the OLED display, and
for the third operating mode, (i) disabling blur and animation functions of the OLED display, (ii) decreasing the resolution of images displayable on the OLED display, and (iii) commanding the OLED display to display only black and red colors.

2. A computer-implemented method, comprising:
determining, at a computing device including one or more processors, a power remaining in a battery of the computing device;
determining, at the computing device, a selected operating mode from a plurality of operating modes for the computing device based on the power remaining in the battery, each of the plurality of operating modes corresponding to a different range of power remaining in the battery of the computing device, wherein the plurality of operating modes include first, second, and third operating modes corresponding to first, second, and third ranges of power remaining in the battery, respectively, the first range being greater than the second range and the second range being greater than the third range; and
adjusting, at the computing device, operation of the computing device based on the selected operating mode, the selected operating mode associated with one or more display functions of the computing device, wherein adjusting operation of the computing device includes adjusting operation of the one or more display functions to adjust power usage of the computing device,
wherein one or more display functions associated with the first operating mode include at least one of blur and animation functions of a display of the computing device and adjusting operation of the computing device for the first operating mode includes disabling at least one of blur and animation functions of the display, and
wherein one or more display functions associated with the second operating mode include a resolution of images displayable on the display of the computing device and adjusting operating of the computing device for the second operating mode includes (i) disabling at least one of blur and animation functions of the display and (ii) decreasing the resolution of images displayable on the display.

3. The computer-implemented method of claim 2, wherein one or more display functions associated with the third operating mode includes commanding a subset of colors displayable by the display.

4. The computer-implemented method of claim 3, wherein the display of the computing device is an organic light emitting diode (OLED) display.

5. The computer-implemented method of claim 4, wherein adjusting operation of the computing device for the third operating mode includes (i) disabling at least one of blur and animation functions of the OLED display, (ii) decreasing the resolution of images displayable on the OLED display, and (iii) commanding the OLED display to display only red and black colors.

6. The computer-implemented method of claim 2, wherein adjusting operation of the one or more display functions to decrease power usage of the computing device includes maintaining the power remaining in the battery of the computing device above a predetermined threshold, the predetermined threshold being a minimum power required to execute an emergency function.

7. The computer-implemented method of claim 6, wherein the emergency function includes dialing an emergency telephone number.

8. The computer-implemented method of claim 2, wherein adjusting operating of the computing device for the second operating mode includes disabling the blur function of the display.

9. A non-transitory, computer-readable medium having instructions stored thereon, which, when executed by one or more processors of a computing device, cause the one or more processors to perform operations including:
   determining a power remaining in a battery of the computing device;
   determining a selected operating mode from a plurality of operating modes for the computing device based on the power remaining in the battery, each of the plurality of operating modes corresponding to a different range of power remaining in the battery of the computing device, wherein the plurality of operating modes include first, second, and third operating modes corresponding to first, second, and third ranges of power remaining in the battery, respectively, the first range being greater than the second range and the second range being greater than the third range; and
   adjusting operation of the computing device based on the selected operating mode, the selected operating mode associated with one or more display functions of the computing device, wherein adjusting operation of the computing device includes adjusting operation of the one or more display functions to adjust power usage of the computing device,
   wherein one or more display functions associated with the first operating mode include at least one of blur and animation functions of a display of the computing device and the instructions cause the one or more processors to adjust operation of the computing device in the first operating mode by disabling at least one of blur and animation functions of the display, and
   wherein one or more display functions associated with the second operating mode include a resolution of images displayable on the display of the computing device and the instructions cause the one or more processors to adjust operation of the computing device in the second operating mode by (i) disabling at least one of blur and animation functions of the display and (ii) decreasing the resolution of images displayable on the display.

10. The computer-readable medium of claim 9, wherein one or more display functions associated with the third operating mode includes commanding a subset of colors displayable by the display.

11. The computer-readable medium of claim 10, wherein the display of the computing device is an organic light emitting diode (OLED) display.

12. The computer-readable medium of claim 11, wherein the instructions cause the one or more processors to adjust operation of the computing device in the third operating mode by (i) disabling at least one of blur and animation functions of the OLED display, (ii) decreasing the resolution of images displayable on the OLED display, and (iii) commanding the OLED display to display only red and black colors.

13. The computer-readable medium of claim 9, wherein the instructions cause the one or more processors to adjust operation of the one or more functions to decrease power usage of the computing device by maintaining the power remaining in the battery of the computing device above a predetermined threshold, the predetermined threshold being a minimum power required to execute an emergency function.

14. The computer-readable medium of claim 13, wherein the emergency function includes dialing an emergency telephone number.

15. The computer-readable medium of claim 9, wherein the instructions cause the one or more processors to adjust operation of the computing device in the second operating mode by disabling the blur function of the display.

16. A computer-implemented method, comprising:
   determining, at a computing device including one or more processors, a power remaining in a battery of the computing device;
   determining, at the computing device, a selected operating mode from a plurality of operating modes for the computing device based on the power remaining in the battery, each of the plurality of operating modes corresponding to a different range of power remaining in the battery of the computing device; and
   adjusting, at the computing device, operation of the computing device based on the selected operating mode, the selected operating mode associated with one or more display functions of the computing device, wherein adjusting operation of the computing device includes adjusting operation of the one or more display functions to adjust power usage of the computing device,
   wherein one or more display functions associated with a first operating mode of the plurality of operating modes includes a resolution of images displayable on the display of the computing device, and wherein adjusting operation of the computing device for the first operating mode includes decreasing the resolution of images displayable on the display.

17. The computer-implemented method of claim 16, wherein one or more display functions associated with a second operating mode of the plurality of operating modes include at least one of blur and animation functions of the display, and wherein adjusting operation of the computing device for the second operating mode includes disabling at least one of the blur and animation functions of the display.

18. The computer-implemented method of claim 16, wherein one or more display functions associated with a third operating mode of the plurality of operating modes include commanding a subset of colors displayable by the display.

19. The computer-implemented method of claim 18, wherein the display is an organic light emitting diode (OLED) display, and wherein adjusting operation of the computing device for the third operating mode includes commanding the OLED display to display only red and black colors.

* * * * *